United States Patent
Jahan et al.

(10) Patent No.: US 10,923,941 B2
(45) Date of Patent: Feb. 16, 2021

(54) SYSTEMS AND METHODS FOR UNIVERSAL SERIAL BUS (USB) POWER DELIVERY WITH MULTIPLE CHARGING PORTS

(71) Applicant: Leviton Manufacturing Company, Inc., Melville, NY (US)

(72) Inventors: A. M. Sarwar Jahan, Melville, NY (US); Levan Papismedov, Melville, NY (US); Tint Y. Aung, Melville, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 52 days.

(21) Appl. No.: 16/134,288

(22) Filed: Sep. 18, 2018

(65) Prior Publication Data

US 2020/0091758 A1    Mar. 19, 2020

(51) Int. Cl.
*H02J 7/00* (2006.01)
*H02J 7/04* (2006.01)

(52) U.S. Cl.
CPC ............... *H02J 7/045* (2013.01); *H02J 7/00* (2013.01); *H02J 7/0019* (2013.01); *H02J 7/00041* (2020.01); *H02J 2207/20* (2020.01)

(58) Field of Classification Search
CPC ............. H02J 7/045; H02J 7/00; H02J 7/0019
See application file for complete search history.

(56) References Cited

U.S. PATENT DOCUMENTS

| | | | |
|---|---|---|---|
| 6,512,682 B2 | 1/2003 | Cohen et al. | |
| 6,614,206 B1 | 9/2003 | Wong | |
| 6,936,936 B2 | 8/2005 | Fischer | |
| 7,170,259 B2 | 1/2007 | Veselic | |
| 7,212,420 B2 | 5/2007 | Liao | |
| 7,239,111 B2 | 7/2007 | Fischer et al. | |
| 7,242,111 B2 | 7/2007 | Menas et al. | |
| 7,285,874 B2 | 10/2007 | Menas et al. | |

(Continued)

FOREIGN PATENT DOCUMENTS

WO    2012068635 A1    5/2012

OTHER PUBLICATIONS

International Search Report and Written Opinion dated Nov. 27, 2019 issued in corresponding PCT Appln. No. PCT/US19/48739.

*Primary Examiner* — Richard V Muralidar
(74) *Attorney, Agent, or Firm* — George Likourezos, Esq.; Carter, DeLuca & Farrell LLP

(57) ABSTRACT

Systems and methods for universal serial bus (USB) power delivery with multiple charging ports or connectors to charge multiple electronic devices. The systems include a power supply having converter(s) that converts an input voltage to different output voltages and outputs; charging ports electrically coupled to the power supply outputs; and a controller electrically coupled to the power supply and the charging ports or connectors. Each of the charging ports is configured to connect to and provide an output voltage selected from the different output voltages to an electronic device. The controller communicates or publishes information regarding the different output voltage levels that can be provided by the power supply to the electronic devices; receives voltage levels selected by the electronic devices via the charging ports; and controls the power supply to provide the selected voltages to the first and second device, respectively.

10 Claims, 16 Drawing Sheets

(56) References Cited

U.S. PATENT DOCUMENTS

| | | | |
|---|---|---|---|
| 7,358,703 B2 | 4/2008 | Veselic | |
| 7,453,233 B2 | 11/2008 | Fischer et al. | |
| 7,485,986 B2 | 2/2009 | Menas et al. | |
| 7,508,092 B2 | 3/2009 | Menas et al. | |
| 7,514,814 B2 | 4/2009 | Menas et al. | |
| 7,573,159 B1 | 8/2009 | Deluliis et al. | |
| 7,579,711 B2 | 8/2009 | Menas et al. | |
| 7,602,079 B2 | 10/2009 | Menas et al. | |
| 7,646,107 B2 | 1/2010 | Smith | |
| 7,646,111 B2 | 1/2010 | Menas et al. | |
| 7,701,168 B2 | 4/2010 | Thijssen | |
| 7,766,698 B1 | 8/2010 | De Iuliis et al. | |
| 7,768,152 B2 | 8/2010 | Menas et al. | |
| 7,791,220 B2 | 9/2010 | Menas et al. | |
| 7,808,122 B2 | 10/2010 | Menas et al. | |
| 7,812,475 B2 | 10/2010 | Menas et al. | |
| 7,812,476 B2 | 10/2010 | Menas et al. | |
| 7,812,477 B2 | 10/2010 | Menas et al. | |
| 7,812,478 B1 | 10/2010 | Menas | |
| 7,816,807 B2 | 10/2010 | Menas et al. | |
| 7,816,808 B2 | 10/2010 | Menas et al. | |
| 7,816,809 B2 | 10/2010 | Menas et al. | |
| 7,816,810 B2 | 10/2010 | Menas et al. | |
| 7,886,104 B2 | 2/2011 | Lai et al. | |
| RE42,385 E | 5/2011 | Wong et al. | |
| 7,960,859 B2 | 6/2011 | Menas et al. | |
| 7,978,489 B1 | 7/2011 | Telefus et al. | |
| 8,219,729 B1 | 7/2012 | Wright | |
| 8,222,773 B2 | 7/2012 | De Iuliis et al. | |
| 8,237,414 B1 | 8/2012 | Li et al. | |
| 8,350,522 B2 | 1/2013 | Johnson | |
| 8,760,123 B2 | 6/2014 | Hawawini et al. | |
| 8,773,078 B2 | 7/2014 | Yu et al. | |
| 8,819,301 B2 | 8/2014 | Lai | |
| 9,496,726 B2 * | 11/2016 | Frid | H01R 13/6666 |
| 9,887,571 B1 | 2/2018 | Sultenfuss et al. | |
| 2004/0251878 A1 | 12/2004 | Veselic | |
| 2007/0035276 A1 | 2/2007 | Webjorn | |
| 2008/0012423 A1 | 1/2008 | Mimran | |
| 2008/0042616 A1 | 2/2008 | Monks | |
| 2008/0073117 A1 | 3/2008 | Misener | |
| 2008/0265838 A1 | 10/2008 | Garg et al. | |
| 2009/0177906 A1 | 7/2009 | Paniagua, Jr. et al. | |
| 2010/0033018 A1 | 2/2010 | Fukasawa | |
| 2010/0090528 A1 | 4/2010 | Makwinski | |
| 2010/0090644 A1 | 4/2010 | Nokkonen | |
| 2010/0237696 A1 | 9/2010 | Maleyran et al. | |
| 2010/0280671 A1 | 11/2010 | Lee | |
| 2011/0035624 A1 | 2/2011 | Miller | |
| 2011/0095722 A1 | 4/2011 | Chang | |
| 2012/0056495 A1 | 3/2012 | Carson et al. | |
| 2012/0166173 A1 | 6/2012 | Fischbach | |
| 2012/0276763 A1 | 11/2012 | Quezada | |
| 2012/0292991 A1 | 11/2012 | Dodal | |
| 2013/0241469 A1 | 9/2013 | Ono | |
| 2013/0267116 A1 | 10/2013 | Tin | |
| 2014/0333263 A1 | 11/2014 | Stewart | |
| 2015/0038006 A1 | 2/2015 | Jansen | |
| 2016/0097522 A1 | 4/2016 | Chien | |
| 2016/0291663 A1 * | 10/2016 | Sun | G06F 1/266 |

* cited by examiner

Voltage control channel 1

Voltage control channel 2

SYSTEMS AND METHODS FOR UNIVERSAL SERIAL BUS (USB) POWER DELIVERY WITH MULTIPLE CHARGING PORTS

BACKGROUND

All residential and commercial buildings have wall outlets for powering AC-powered devices, such as lights, appliances, electronic devices, computers, and mobile devices. The AC-powered devices typically have a power cord with a plug configured to be connected to and removed from the wall outlet.

An outlet is a female connector with slots or holes in the wall outlet. The slots are configured to receive a male connector often referred to as a plug. The plug has protruding prongs, blades, or pins that fit into matching slots in the wall outlet. The wall outlet is enclosed by a cover typically called a wall plate, face plate, outlet cover, socket cover, or wall cover. Different countries have different national standards for wall outlets. The national standards differ by voltage rating, current rating, connector shape, connector size, and connector type.

Due to proliferation of various rechargeable consumer electronic devices, such as cell phones, laptops, tablets, personal digital assistants (PDA's), and the like, there is a need to charge and/or connect to such devices. Most of these devices are powered by low voltage. Recharging these devices may be facilitated through the use of standard interfaces, such as a Universal Serial Bus (USB).

There have been developed a number of standards and solutions for providing power via USB. USB standards define the physical and electrical specifications of USB. Examples of these standards include USB 3.1, USB Power Delivery, and their revisions. USB has several types of connectors including USB Type-A and Type-C. Such USB Connectors can be used to supply power to a device.

SUMMARY

Embodiments of the present disclosure are described in detail with reference to the drawing figures wherein like reference numerals identify similar or identical elements.

An aspect of the present disclosure features a universal serial bus (USB) charging system configured to charge connected electronic devices. The system includes a power supply including a power supply including a plurality of power converters and a plurality of power supply outputs electrically coupled to the plurality of power converters, respectively, each of the plurality of power converters configured to convert an input voltage to a plurality of different output voltages; a plurality of charging ports electrically coupled to the plurality of power supply outputs, respectively, each of the plurality of charging ports configured to connect to, and provide an output voltage selected from the plurality of different output voltages to, an electronic device; and a controller in electrical communication with the power supply and the plurality of charging ports. The controller includes one or more processors and a memory having stored thereon instructions which, when executed by the processor, cause the controller to: communicate information regarding the plurality of different output voltages to first and second electronic devices via respective first and second charging ports of the plurality of charging ports; receive, via the respective first and second charging ports, information regarding first and second output voltages selected from the plurality of different output voltages by the respective first and second electronic devices; and control the power supply to provide the selected first output voltage to the first electronic device and to provide the selected second output voltage to the second electronic device.

In another aspect of the present disclosure, the USB charging system further includes a first power delivery (PD) integrated circuit and a second PD integrated circuit, the first and second PD integrated circuits in electrical communication with the controller and configured to selectively disable transmission of electrical energy to corresponding charging ports.

In an aspect of the present disclosure, the controller communicates a first set of output voltages to the first electronic device and communicates a second set of output voltages to the second electronic device, wherein the first set is different from the second set.

In another aspect of the present disclosure, the instructions, when executed by the one or more processors, further cause the controller to determine the first and second sets of output voltages based on at least one parameter associated with the first and second electronic devices, respectively.

In yet another aspect of the present disclosure, the at least one parameter is at least one of the current being drawn by each of the first and second electronic devices, the charge levels of each of the first and second electronic devices, the period over which each of the first and second electronic devices have been charged by the USB charging system, and the priority level of each of the first and second electronic devices.

In a further aspect of the present disclosure, the charging ports are USB Type-C charging ports.

In yet a further aspect of the present disclosure, the priority level is determined based on the order in which the first and second electronic devices are connected to the USB charging system.

In an aspect of the present disclosure, the system further includes a current sense resister coupled to each of the first and second charging ports. The instructions, when executed by the one or more processors, cause the controller to measure voltage across each of the current sense resistors and determine a charge level of each of the first and second electronic devices based on the measured voltages.

In another aspect of the present disclosure, the controller determines a first set of output voltages that includes an output voltage greater than the output voltages in the second set of output voltages, if the first electronic device has the lower charge level than the second electronic device. In yet another aspect of the present disclosure, the first and second sets of output voltages are determined based on total power that can be provided by the USB charging system.

Yet another aspect of the present disclosure presents a method for charging electronic devices. The method includes communicating information regarding different output voltages to first and second electronic devices via first and second charging ports, respectively, receiving, via the respective first and second charging ports, information regarding first and second output voltages selected by the respective first and second electronic devices from the different output voltages, converting an input voltage to the selected first and second output voltages, and providing the selected first output voltage to the first electronic device and providing the selected second output voltage to the second electronic device.

In an aspect of the present disclosure, a first set of output voltages is communicated to the first electronic device and a second set of output voltages is communicated to the second electronic device, wherein the first set is different from the second set.

In another aspect of the present disclosure, the method includes determining the first and second sets of output voltages based on at least one parameter associated with each of the first and second electronic devices, respectively.

In yet another aspect of the present disclosure, the at least one parameter is at least one of the current being drawn by each of the first and second electronic devices, the charge levels of each of the first and second electronic devices, the period over which each of the first and second electronic devices have been charged, and the priority level of each of the first and second electronic devices.

In a further aspect of the present disclosure, the method includes determining the priority level based on the order in which the first and second electronic devices are connected to the USB charging system.

In yet a further aspect of the present disclosure, the method includes measuring a first current supplied to the first electronic device, determining a first charge level based on the first current, measuring a second current supplied to the second electronic device, and determining a second charge level based on the second current.

In another aspect of the present disclosure, the method includes determining whether the first electronic device has a lower charge level than the second electronic device, wherein the first and second sets of output voltages are determined so that the first set of output voltages includes an output voltage greater than the output voltages in the second set of output voltages, if it is determined that the first electronic device has a lower charge level than the second electronic device. In yet another aspect of the present disclosure, the first and second sets of output voltages are determined based on total power that can be provided by the USB charging system.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the present invention may be more readily understood by one skilled in the art with reference being had to the following detailed description of several embodiments thereof, taken in conjunction with the accompanying drawings wherein like elements are designated by identical reference numerals throughout the several views, and in which:

Figure 1:
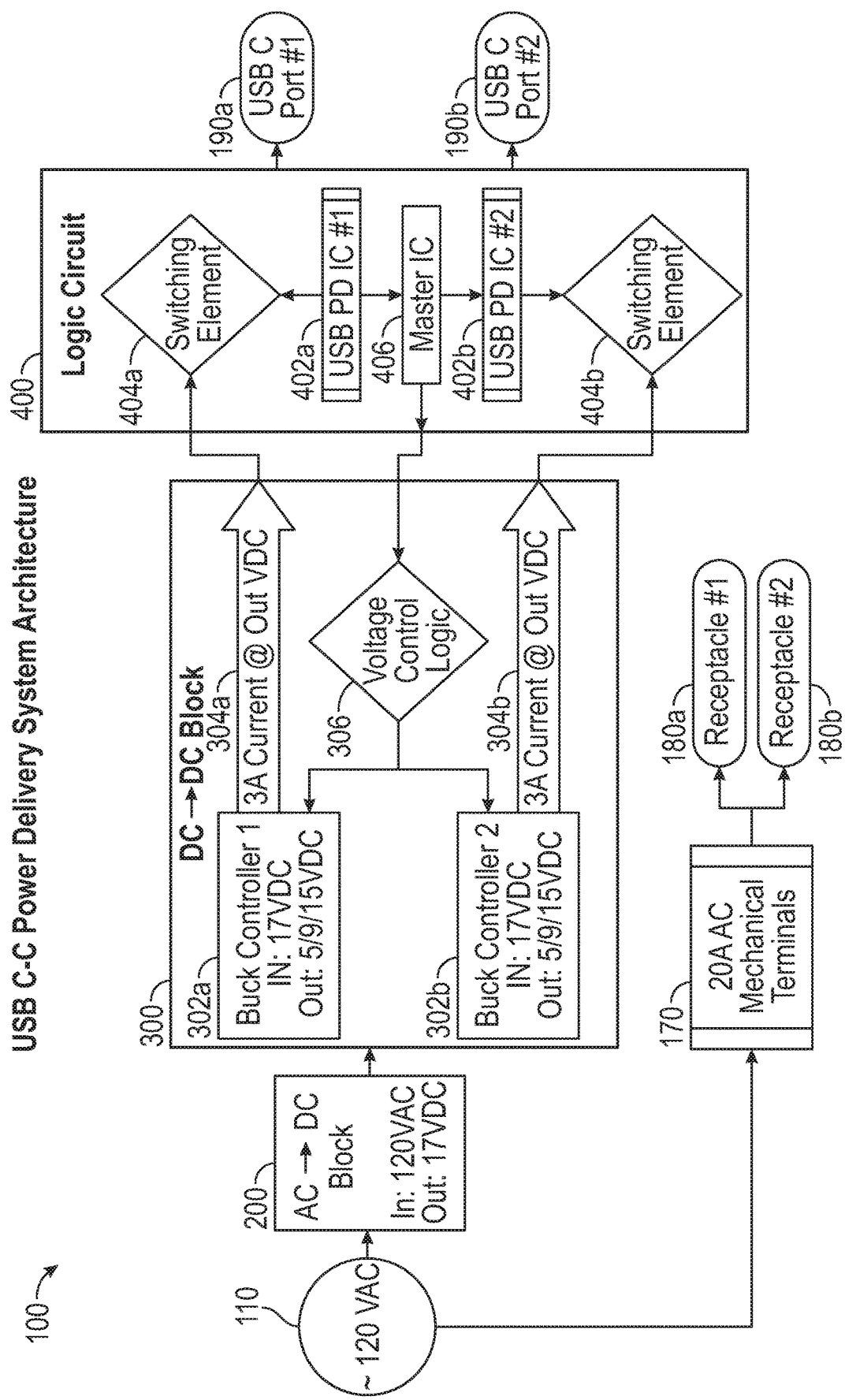
FIG. 1 depicts a block diagram of a USB power delivery system architecture in accordance with the disclosure.

The figures depict embodiments of the present disclosure for purposes of illustration only. One skilled in the art will readily recognize from the following description that alternative embodiments of the structures and methods illustrated herein may be employed without departing from the principles of the present disclosure described herein.

DETAILED DESCRIPTION

The present disclosure is directed to systems and methods for implementing USB power delivery mechanisms with multiple charging ports. Embodiments of the present disclosure are described herein below with reference to the accompanying drawings. However, it is to be understood that the disclosed embodiments are merely exemplary of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Line voltage refers to a voltage, typically Alternating Current (AC), that is supplied to buildings/residences (e.g., electric light and power), for example, 110 V AC, 115 V AC, 120 V AC, 125 V AC, 208 V AC, 220 V AC, 230 V AC, 240 V AC, single or multiphase. Line voltage is typically made available to the end user standard plug/outlet configurations standardized by the National Electrical Manufacturers' Association (NEMA) configurations. One such standardized configuration is a NEMA 5-15 configuration which denotes a nominal 125 V AC/15 Amp outlet.

Low voltage refers to a voltage which is less than a certain threshold (50 Volts for example, AC or DC). This reduced voltage is typically used for communication, signaling, data/multimedia transmission, low voltage charging, and the like. For the purposes of this application, the term low voltage also includes optical transmission (although no electrical voltage is actually transmitted by optical transmission).

Low voltage ports denote any suitable type of low voltage ports, such as, but not limited, to Universal Serial Bus (USB), Audio/Video/Multimedia ports, Digital Visual Interface (DVI), Ethernet/data ports, High Definition Multimedia Interface (HDMI), IEEE 1394 (FireWire), Separate Video (S-Video), Video Graphics Array (VGA), Telephone, and the like, or any suitable combination thereof. For the purposes of this application, low voltage ports can also include fiber optic ports (although no electrical voltage is actually transmitted by fiber optic ports). USB ports can further be broken out into various form factors such as Type A, Type B, Type C, Mini-A, Mini-B, Micro-A, Micro-B, or any other suitable form.

The USB power delivery systems and methods of the present disclosure can provide power delivery charging capabilities to multiple ports. The total power is shared when multiple devices are connected. It is contemplated that the USB power delivery systems and methods of the present disclosure can have single or multiple ports by simply adding DC/DC sections and control logic. Most existing USB Type-C chargers are single port or dual port with no power distribution functionality. The USB Type-C power delivery systems and methods of the present disclosure can provide full or partial power delivery voltages depending on the status of the devices connected to the USB power delivery systems.

FIG. 1 depicts a USB power delivery system architecture 100 in accordance with the present disclosure. In an embodiment, the alternating current (AC) power source 110 supplies AC power to an AC/DC converter 200. It is contemplated that the AC power source 110 can be any AC power source such as from a residential or commercial electrical system, from a solar power supply's inverter, an AC generator, or any other suitable power supply source. The AC/DC converter 200 converts the AC voltage supplied by the power supply, for example 120 V AC, to a lower level DC voltage, for example, 17 V DC.

Next, the DC voltage generated at the AC/DC converter 200 is processed by a DC/DC converter block 300. The DC/DC converter block 300 may step down the DC voltage. The DC/DC converter block 300 may include, for example, a number of buck converters 302a, 302b as well as voltage control logic 306. It is contemplated that other types of DC/DC converters may be used such as, for example, linear regulators.

In an aspect of the present disclosure, the outputs 304a, 304b of the DC/DC converter block 300 supply power to a logic circuit 400 that includes switching elements 404a, 404b, USB power distribution (PD) integrated circuits (IC) 402a, 402b, and a master controller IC 406. The master controller IC 406 decides how much power to supply through the USB power delivery controller ICs 402a, 402b, to either of the two USB Type-C power distribution connectors 190a, 190b.

The USB power delivery system 100 advertises or publishes available voltage levels to devices connected to the connectors 190a, 190b, which, in turn, reply with requested voltage levels. The available voltage levels may be determined based on the charge levels of one or more devices connected to either or both of the USB Type-C power distribution connectors 190a, 190b and the output power capacity of the USB power delivery system 100. The USB power delivery system 100 then outputs voltages to either or both of the USB Type-C power distribution connectors 190a, 190b based on the voltage levels requested by the connected one or more devices.

The first USB power delivery controller IC 402a, and the second USB power delivery controller IC 402b, are electrically coupled to the master controller IC 406 and configured to selectively disable transmission of electrical energy to corresponding connectors 190a, 190b. This includes disabling transmission of electrical energy to a connector 190a, 190b when a corresponding electronic device connected to a connector 190a, 190b is fully charged or when an overcurrent condition is detected.

The master controller IC 406 communicates with the voltage control logic 306 to control the DC/DC buck boost converters 302a, 302b. Ultimately, the two or more USB Type-C connectors 190s, 190b are supplied power from the logic circuit 400 for supplying power to devices connected to these USB Type-C connectors 190s, 190b. It is contemplated that devices can be electric and/or electronic. In an embodiment, mechanical terminals 170 and receptacles 180a, 180b may operate off of the same power supply 110. It is contemplated that these receptacles 180a, 180b may be used to supply AC power to a variety of items, for example, lights, TVs, radio, etc.

Figure 2:
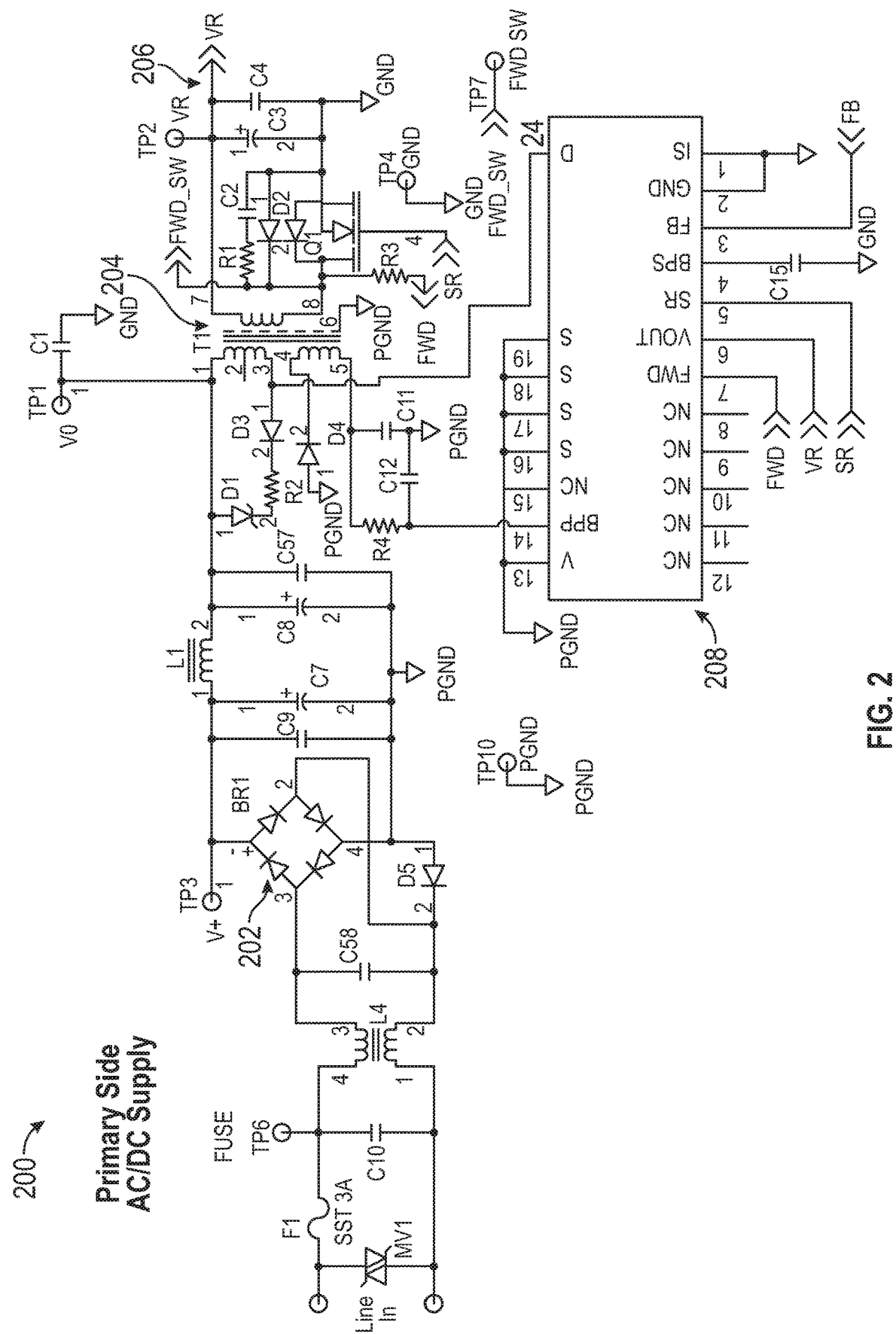
FIG. 2 depicts a schematic diagram of an example embodiment of the AC/DC converter of FIG. 1.

FIG. 2 depicts a schematic of an AC/DC converter 200 in accordance with the present disclosure. The AC/DC converter 200 typically takes an input from an AC power source 110 and processes it through the bridge rectifier 202. Bridge rectifier 202 converts AC to DC voltage by providing full wave rectification from a two-wire AC input. The polarity of the output is the same regardless of the polarity of the input. The DC signal created by the bridge rectifier 202 may have some amount of ripple on it, which is filtered out by filtering capacitors and inductors coupled to the output terminals of the bridge rectifier 202. The DC voltage is then stepped down with a transformer 204 and further filtered by a filter 206. A flyback converter 208 may be used to regulate the DC voltage.

Figure 3:
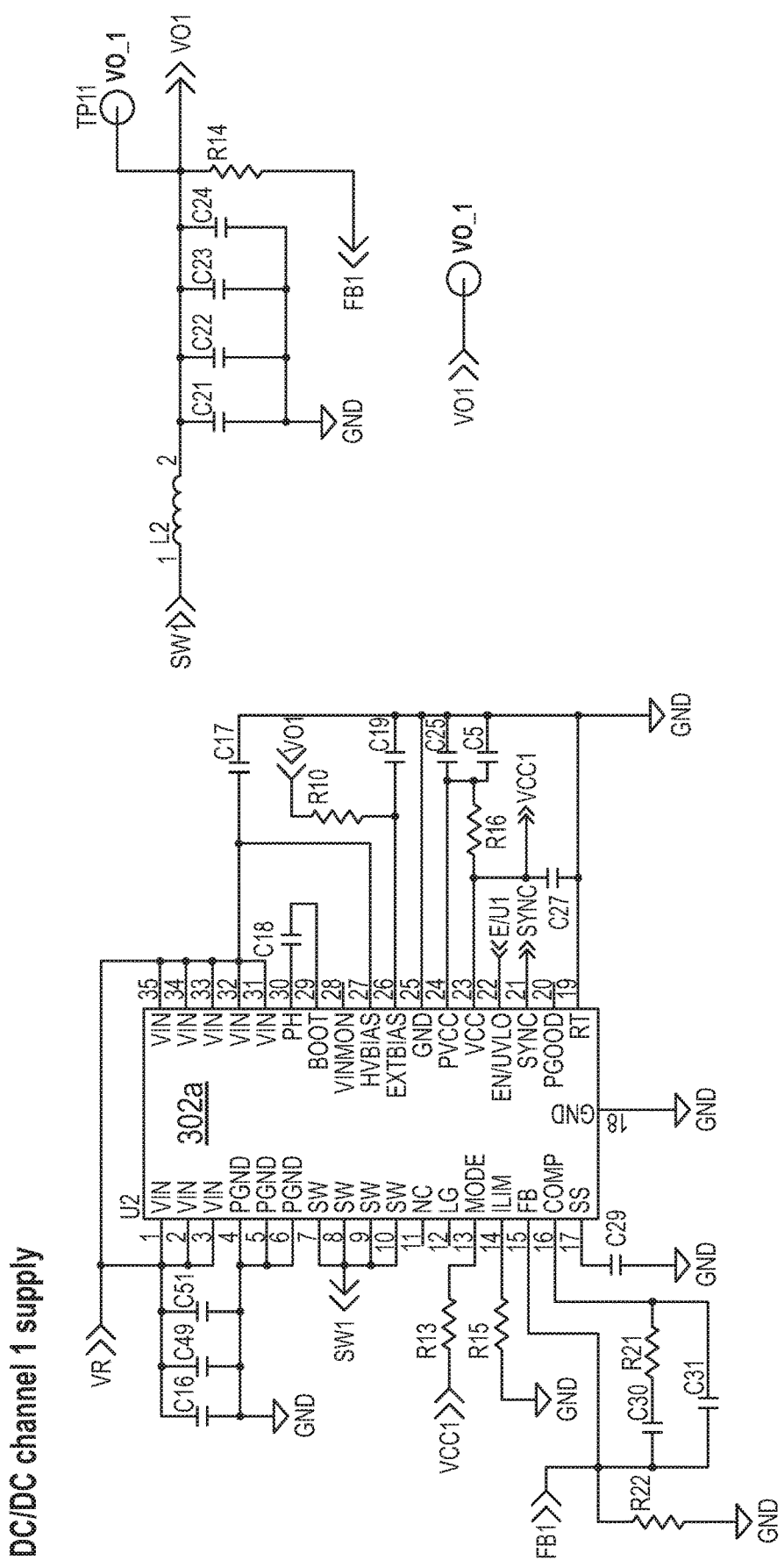
FIG. 3 depicts a schematic diagram of an example embodiment of a pair of DC/DC buck converters of FIG. 1.
Figure 3:
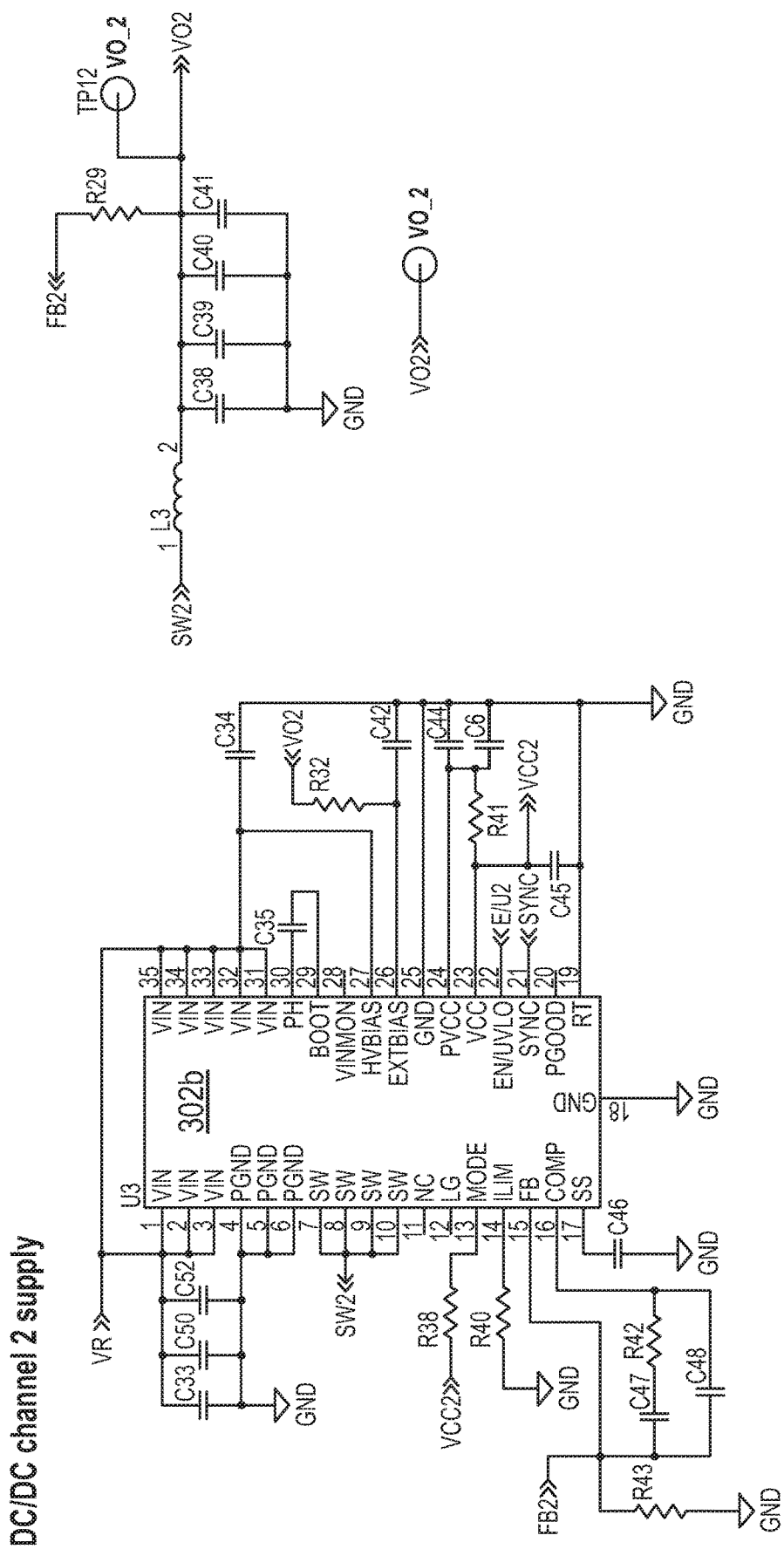
Figure 3:
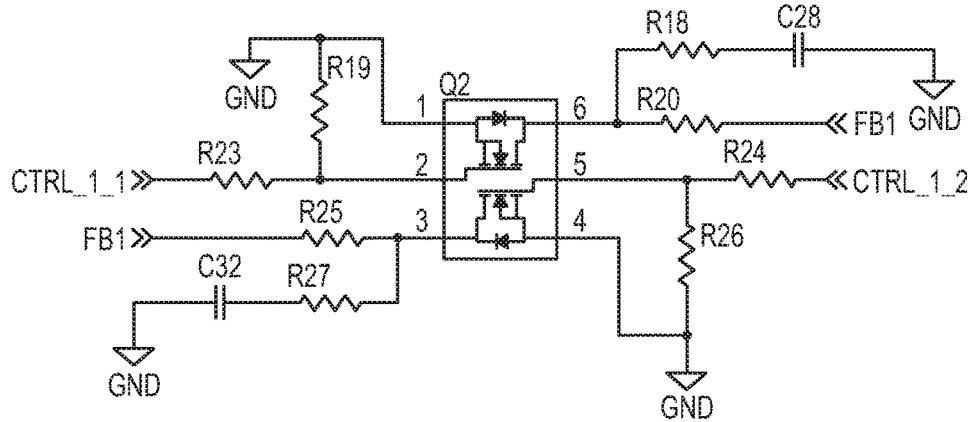
Figure 3:
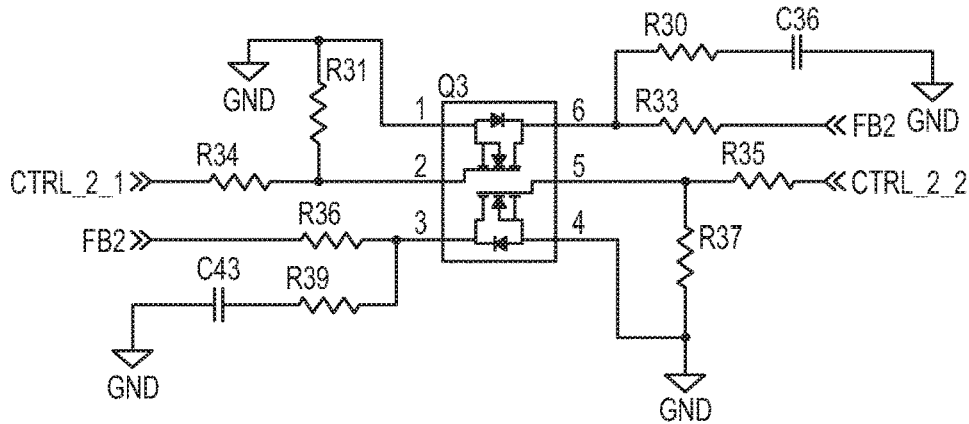
Figure 3:
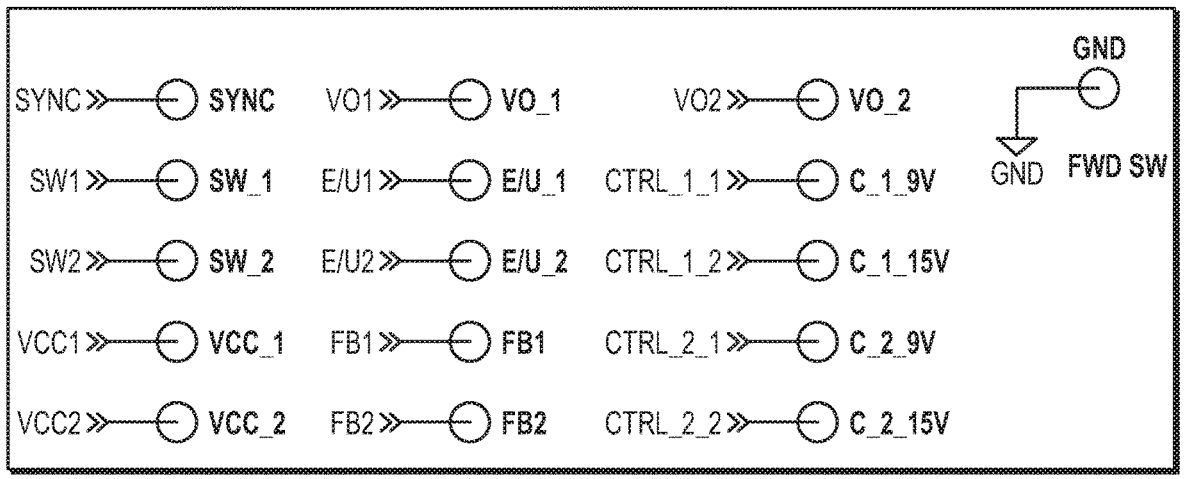

FIG. 3 depicts a schematic of a pair of DC/DC buck-boost converters 302a, 302b, in accordance with the present disclosure. The regulated voltage produced by the AC/DC converter 200 is further processed by a pair of buck-boost converters. A DC/DC buck-boost converter 302a, 302b is a type of DC/DC converter that can have an output voltage magnitude that is either greater than or less than the input voltage magnitude. Typically, DC/DC buck-boost converters 302a, 302b utilize an internal PWM controller to support a wide range of output voltages, for example, 3.3 V to 65 V.

Figure 4:
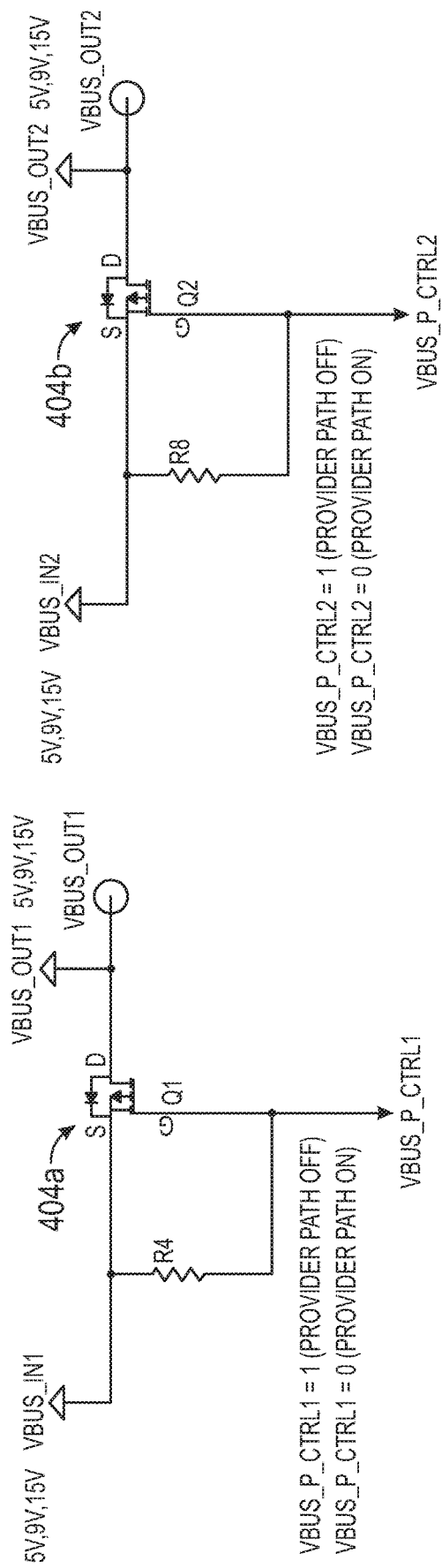
FIG. 4 depicts a schematic diagram of an example embodiment of a pair of switching elements of FIG. 1.
Figure 5A:
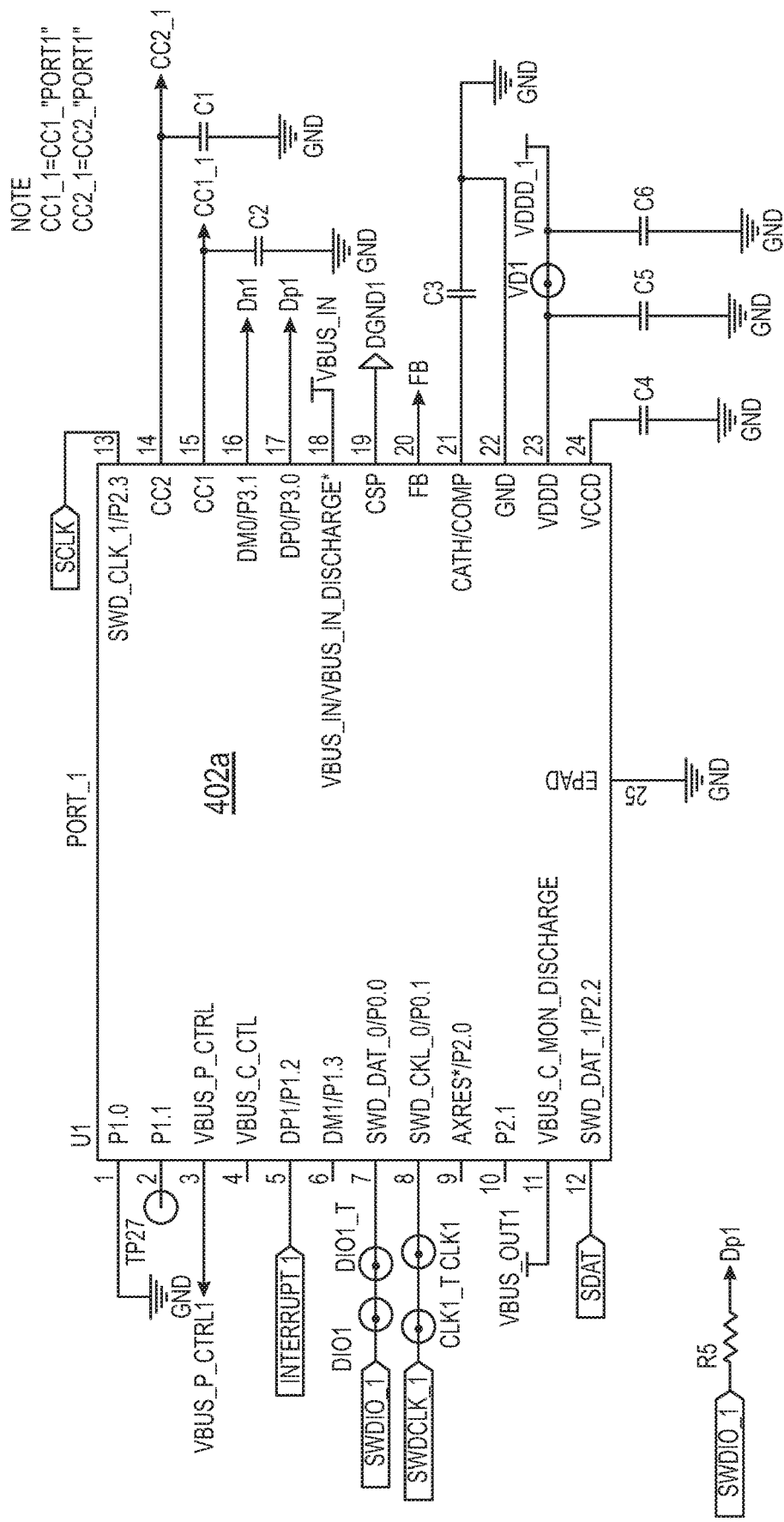
FIG. 5A depicts a schematic diagram of an example embodiment of a pair of USB power delivery controller integrated circuits of FIG. 1.
Figure 5B:
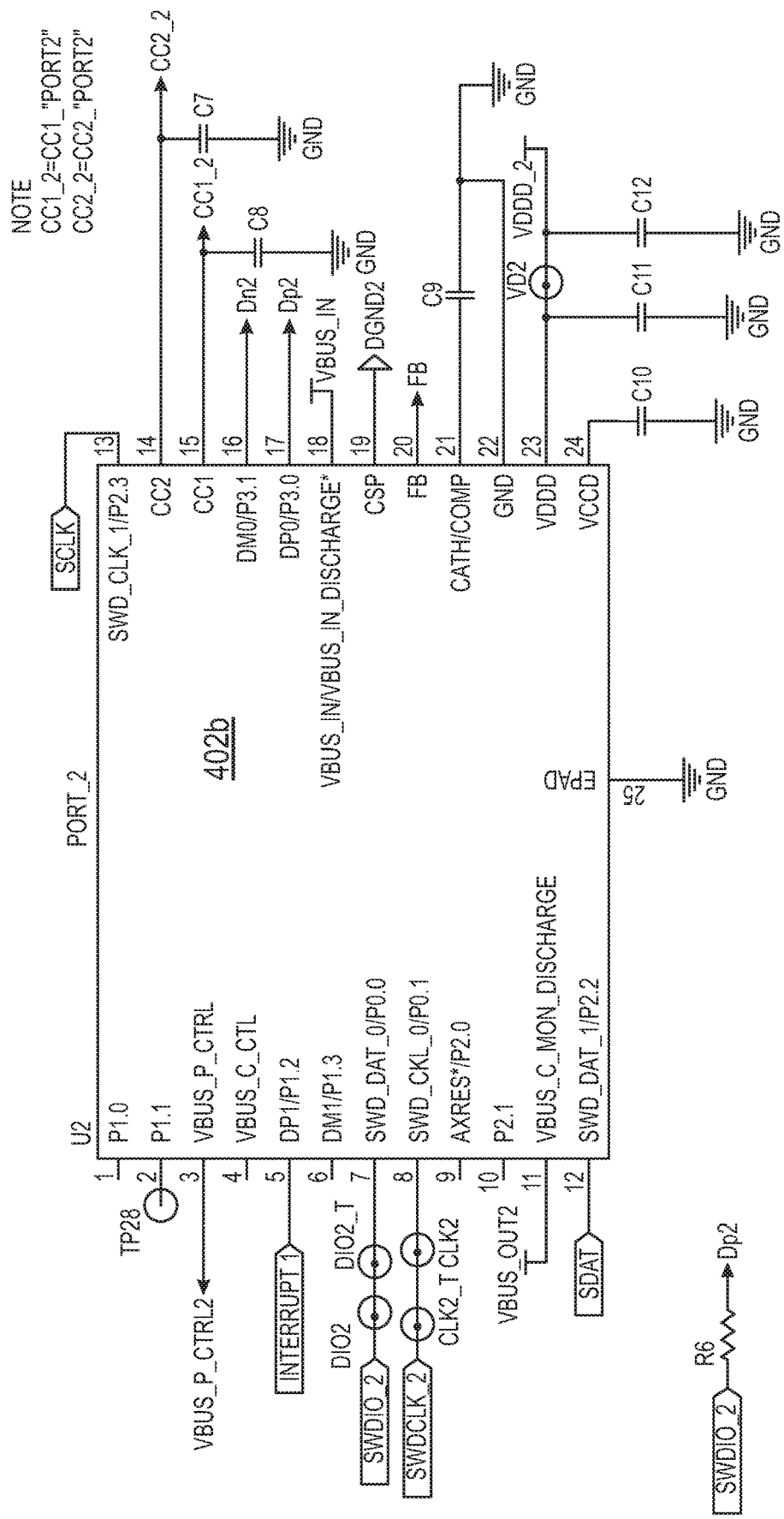
FIG. 5B depicts a schematic diagram of an example embodiment of a pair of USB power delivery controller integrated circuits of FIG. 1.

FIGS. 4, 5A, and 5B depict a schematic of a pair of switching elements 404a, 404b, and a pair of USB power delivery controller ICs 402a, 402b, in accordance with the present disclosure. The voltage VBUS (for example, 5, 9, or 15 V DC) from the DC/DC buck-boost converters 302a, 302b is provided to the switching element 404a, 404b, which are controlled by the USB power delivery controller ICs 402a, 402b by outputting a gate control current. The USB power delivery controller ICs 402a, 402b, may include a current sense amplifier, a high voltage regulator, overvoltage protection, overcurrent protection, and supply switch blocks. The USB power delivery controller ICs 402a, 402b also may provide Electro-static discharge (ESD) protection to the USB Type-C power distribution connectors 190a, 190b.

The USB power delivery controller ICs 402a, 402b can operate in accordance with BC 1.2, Apple®, Qualcomm's® quick charge 4.0, and Samsung® AFC. In one embodiment, the USB power delivery controller ICs 402a, 402b, can supply full power delivery charging capability to multiple ports. When multiple devices are connected to the USB power delivery system 100, the total power that can be output from the USB power delivery system 100 can be shared between those devices. Thus, full or partial power delivery voltages can be provided to the devices. It is contemplated that there are multiple USB Type-C power distribution connectors 190*a*, 190*b*, that can share power delivery according to an appropriate ratio (e.g., based on a charge level of the devices connected to the connectors 190*a*, 190*b*) or supply one of the connectors 190*a*, 190*b* full power delivery. It is contemplated that other types of connectors, including other types of USB connectors may be used.

Figure 6:
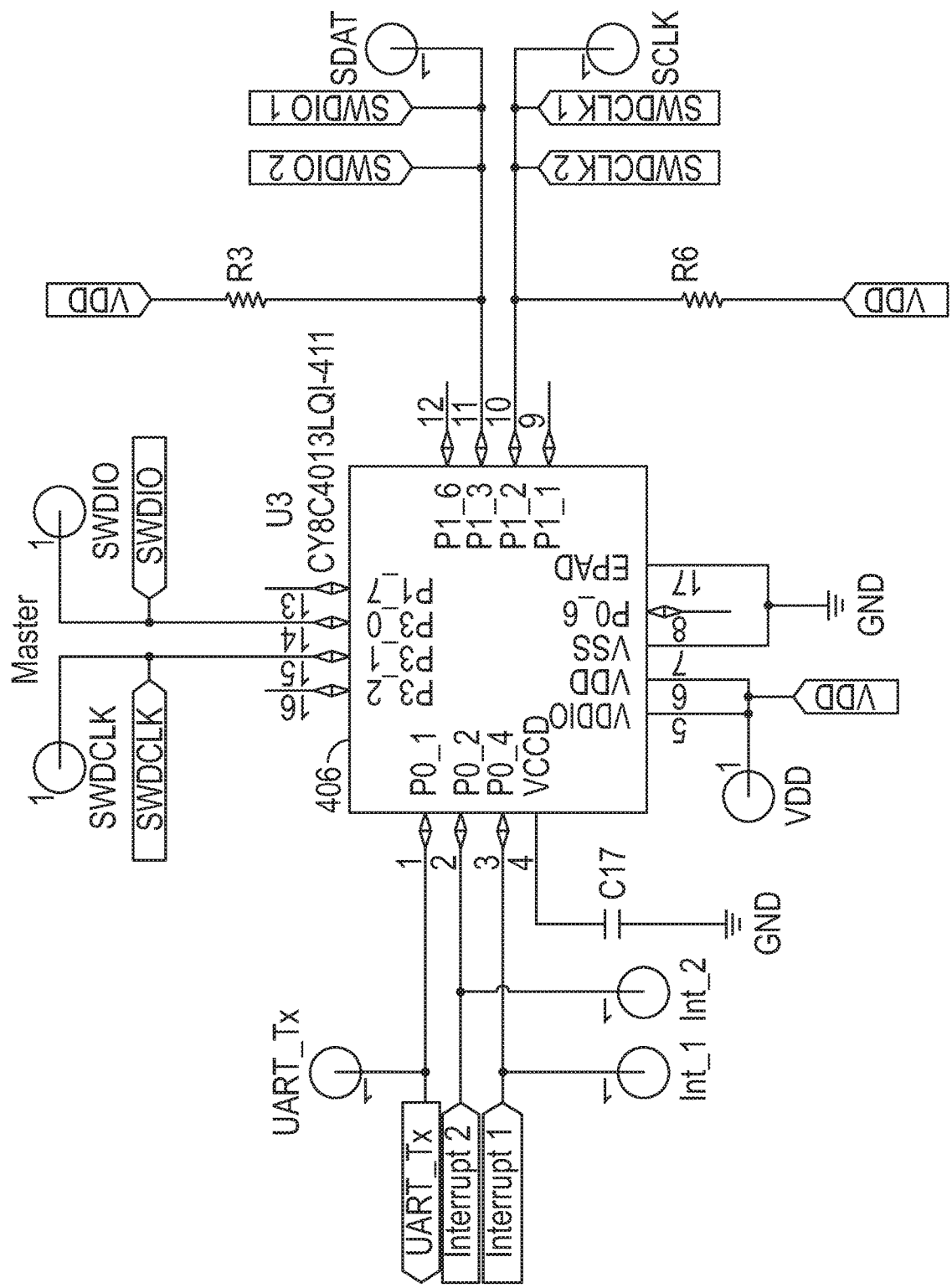
FIG. 6 depicts a schematic diagram of an example embodiment of a master controller of FIG. 1.

FIG. 6 depicts a schematic of a master controller IC 406 in accordance with the present disclosure. The master controller IC 406 determines the charging voltage levels that can be supplied to one or more electronic devices connected to one or more of the connectors 190*a*, 190*b* without exceeding the output power capacity of the USB power delivery system, and transmits the charging voltage levels to the one or more electronic devices. When the master controller IC 406 receives the charging voltage levels selected by the one or more electronic devices, the master controller IC 406 communicates with the voltage control logic 306 of FIG. 1 to cause the voltage control logic 306 to adjust the output voltages of the pair of DC/DC buck boost converters 302*a*, 302*b* based on the charging voltage levels selected by the one or more electronic devices.

In one embodiment, the master controller IC 406 can re-determine the voltage levels for charging the first device and/or the second device based on further communications with the first device and/or the second device; and output a first voltage at an updated first voltage level and/or a second voltage at an updated second voltage level. In another embodiment, the master controller IC 406 communicates to the first and/or second devices the charging voltage levels available through its respective low voltage port connections. The device charging voltage for each device is determined by the master controller IC 406 as a function of an available charging power and the voltage level for charging the first device and/or the second device. The USB power delivery controller ICs 402*a*, 402*b* handle all USB C protocols and performs functions such as overcurrent protection.

In one embodiment, the master controller IC 406 can cause the USB power delivery system 100 to determine a priority of the first and second devices including determining which of the first device or the second device is first connected to a charging system. In another embodiment, the master controller IC 406 causes the USB power delivery system 100 to determine the priority of the first and second devices including measuring, estimating, or deducing the charge level of the first device and the second device. The charging according to the priority includes charging the device having the lower charge level with a higher voltage level than the device having the higher charge level. As used herein, charge level refers to the level at which a rechargeable battery is charged relative to full charge. It may also be referred to as state of charge.

In one embodiment, a first device, when connected to the first USB Type-C power distribution connector 190*a*, may request two thirds of the power capacity of the USB power delivery system 100, and a second device, when connected to the second USB Type-C connector 190*b*, may also request two thirds of the power capacity of the USB power delivery system 100. The master controller IC 406 may determine that the first device has priority and deliver the two thirds of the available power to the first device, and only one third of the available power to the second device.

In another embodiment, a first device, when connected to the first USB Type-C power distribution connector 190*a*, may request two thirds of the available power, and a second device, when connected to the second USB Type-C connector 190*b*, may also request two thirds of the available power. The master controller IC 406 may determine that both devices should share power equally and deliver half of the available power to the first device and the other half of the available power to the second device. It is contemplated that any division of power between the two USB Type-C power distribution connectors 190*a*, 190*b* may be determined by the master controller IC 406.

Figure 7:
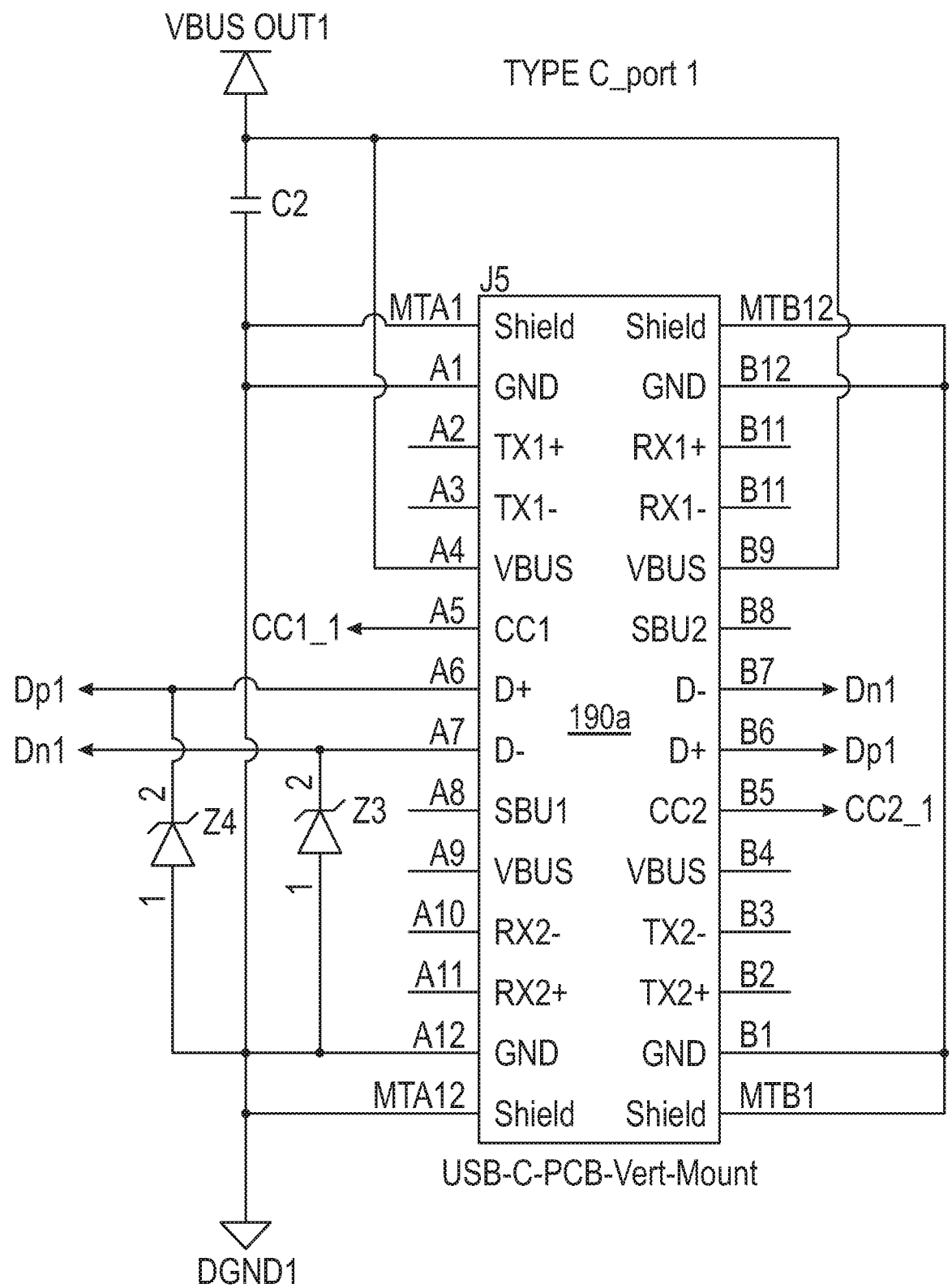
FIG. 7 depicts a schematic diagram of an example embodiment of USB Type-C power distribution connectors of FIG. 1.
Figure 7:
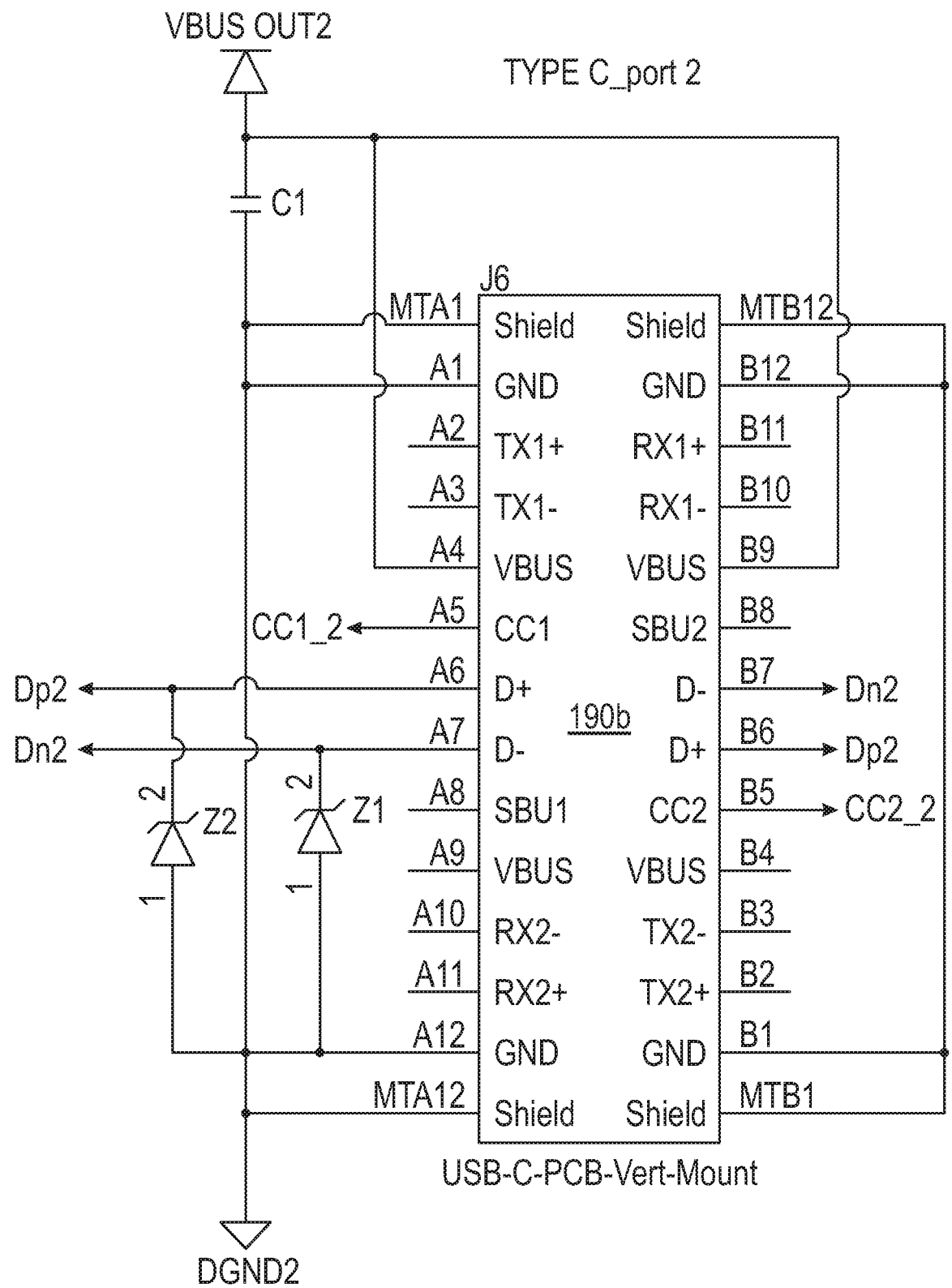

FIG. 7 depicts a schematic of USB Type-C power distribution connectors 190*a*, 190*b* in accordance with the present disclosure. The USB Type-C power distribution connectors 190*a*, 190*b* connect with both the USB power delivery system 100 and external devices. In an embodiment, the USB Type-C power distribution connectors 190*a*, 190*b* conform to a standard configuration, for example, a double-sided connector with 24 pins. The female connector may include four power pins and four ground pins, two differential pairs for high-speed USB data, four shielded differential pairs for Enhanced SuperSpeed data, two Sideband Use (SBU) pins, and two Configuration Channel (CC) pins. The CC pins on the device are used to carry USB power distribution communications.

Figure 8:
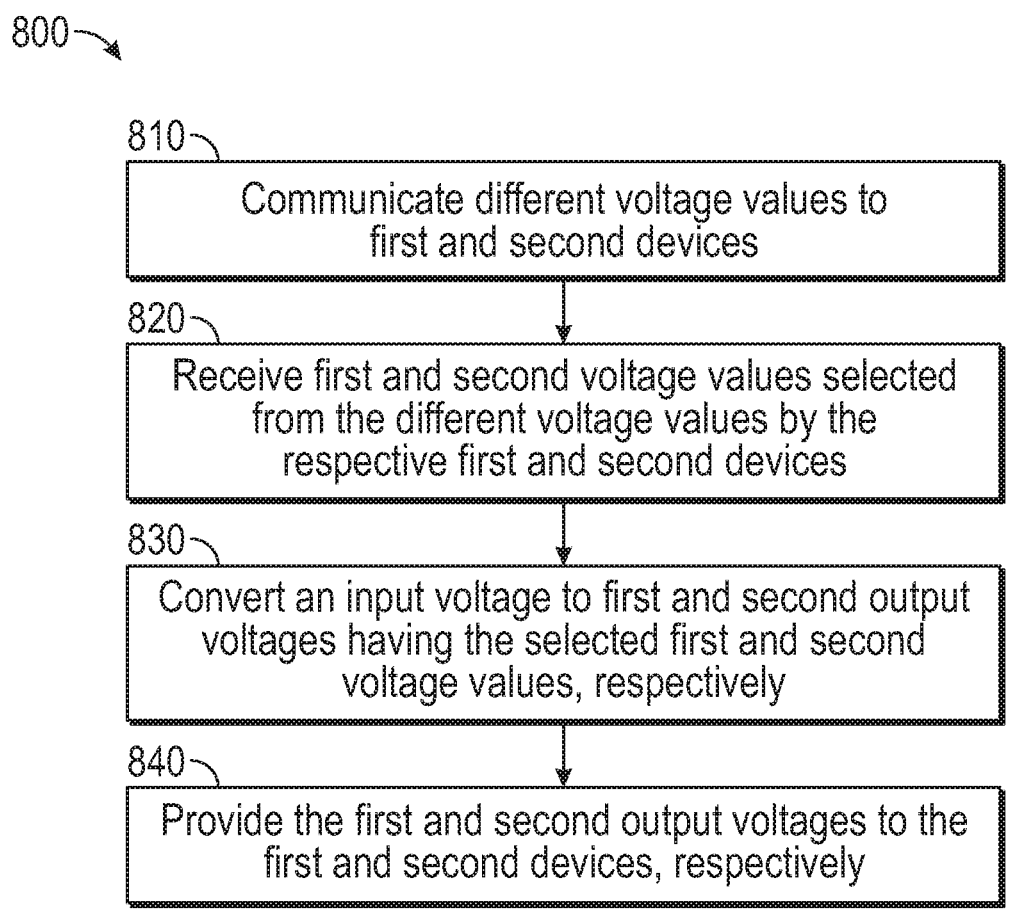
FIG. 8 is a flow chart illustrative of the method of delivering power in accordance with the present disclosure.

FIG. 8 is a flow chart illustrative of a method of delivering power 800 in accordance with the present disclosure. The method 800 includes various blocks described in an ordered sequence. However, those skilled in the art will appreciate that one or more blocks of the method 800 may be performed in a different order, repeated, and/or omitted without departing from the scope of the present disclosure. Further, the below description of the method 800 refers to various actions or tasks performed by the master controller IC 406, but those skilled in the art will appreciate that in some instances, the master controller IC 406 performs the actions or tasks via one or more software applications, such as the application which could be firmware, executing on the master controller IC 406.

The method may begin with the master controller IC 406 communicating or publishing different voltage levels to first and second electronic devices via respective first and second connectors 190*a*, 190*b* (block 810). For example, a USB Type-C device, such as a mobile device or a laptop, may be connected to the first USB Type-C power distribution connector 190*a*. Then, the master controller IC 406 receives first and second voltage levels from the respective first and second electronic devices via the respective first and second charging connectors (block 820). The communication of the voltage levels may be conducted through the Configuration Channel (CC) pins of the USB connectors 190*a*, 190*b*. The second device may be different from the first device, with different power or charging requirements. For example, the first device could require 2 watts and the second device could require 7 watts.

The master controller IC 406 then causes an input voltage to be converted to the first and second output voltages having the selected first and second voltage values, respectively (block 830). For example, the first electronic device may select +15 V DC, whereas the second electronic device may select +5 V DC. Thus, the input voltage, which may be 120 V AC, gets converted via the pair of DC/DC buck-boost converters 302*a*, 302*b* to +15 V DC and +5 V DC, respectively.

Finally, the master controller IC 406 controls the power supply (comprised of the USB power delivery controller ICs

402*a*, 402*b* and the DC/DC converter block 300) to output a first voltage at the received first voltage level to the first electronic device and output the second voltage at the received second voltage level to the second electronic device (block 840). For example, the master controller IC 406 may determine that the first electronic device has requested +5 V DC, and communicate that information to both the USB power delivery controller IC 402*a* and the DC/DC converter block 300, which may adjust its output according to this request. The master controller IC 406 may also determine that the second electronic device requested +15 V DC. That information is communicated to the USB power delivery controller IC 402*b* and the DC/DC converter block 300, which may adjust its output according to this request.

It is contemplated that the master controller IC 406 could determine the priority levels of the devices, and set the maximum power to be supplied to the devices and the corresponding sets of voltage levels to be published to the devices, accordingly. This priority can be set, for example, by determining which device was connected first, by determining which one was closer to being fully charged (e.g., by deducing the charge level), or by a communication via USB communications. It is contemplated that additional charging ports can be utilized by adding additional logic and DC sections.

In another embodiment, the USB power delivery system 100 can deduce the charge level of the connected electronic devices by measuring the charge time and/or the current being provided to the connected electronic devices and analyzing the measurements in view of charging profiles provided by the connected electronic devices. Based on the deduction, the USB power delivery system 100 can reprioritize the charging of the electronic devices. In another embodiment, reprioritizing may be based on how long a single electronic device has been plugged into a USB Type-C power distribution connector 190*a*, 190*b*. For example, if an electronic device has been plugged in for a substantial period, the electronic device is likely to be substantially charged and all or a large portion of output charging power may be reallocated to a more recently plugged in electronic device.

Figure 9:
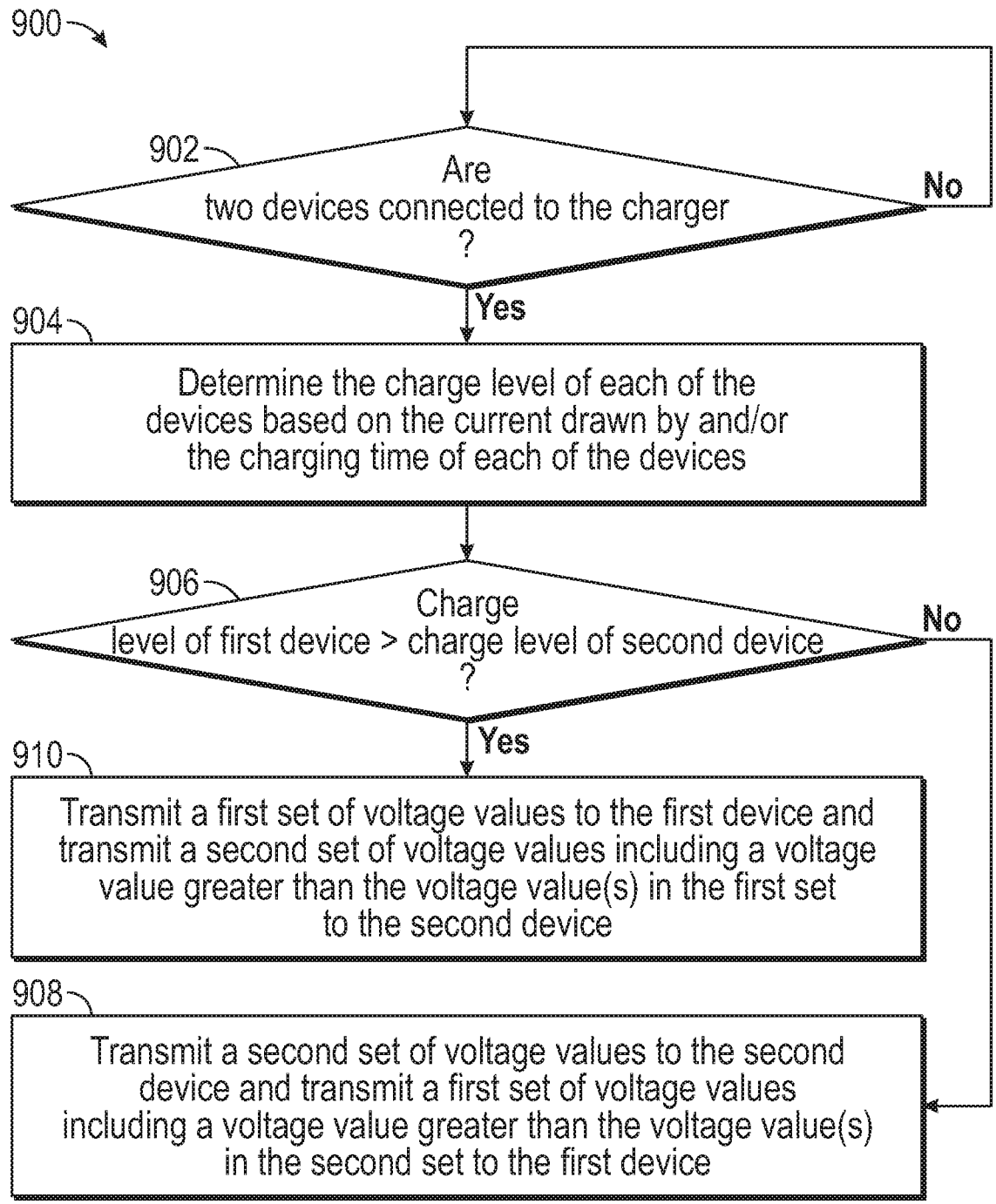
FIG. 9 is a flow chart illustrative of the method of charging electronic devices in accordance with the present disclosure.
Figure 10:
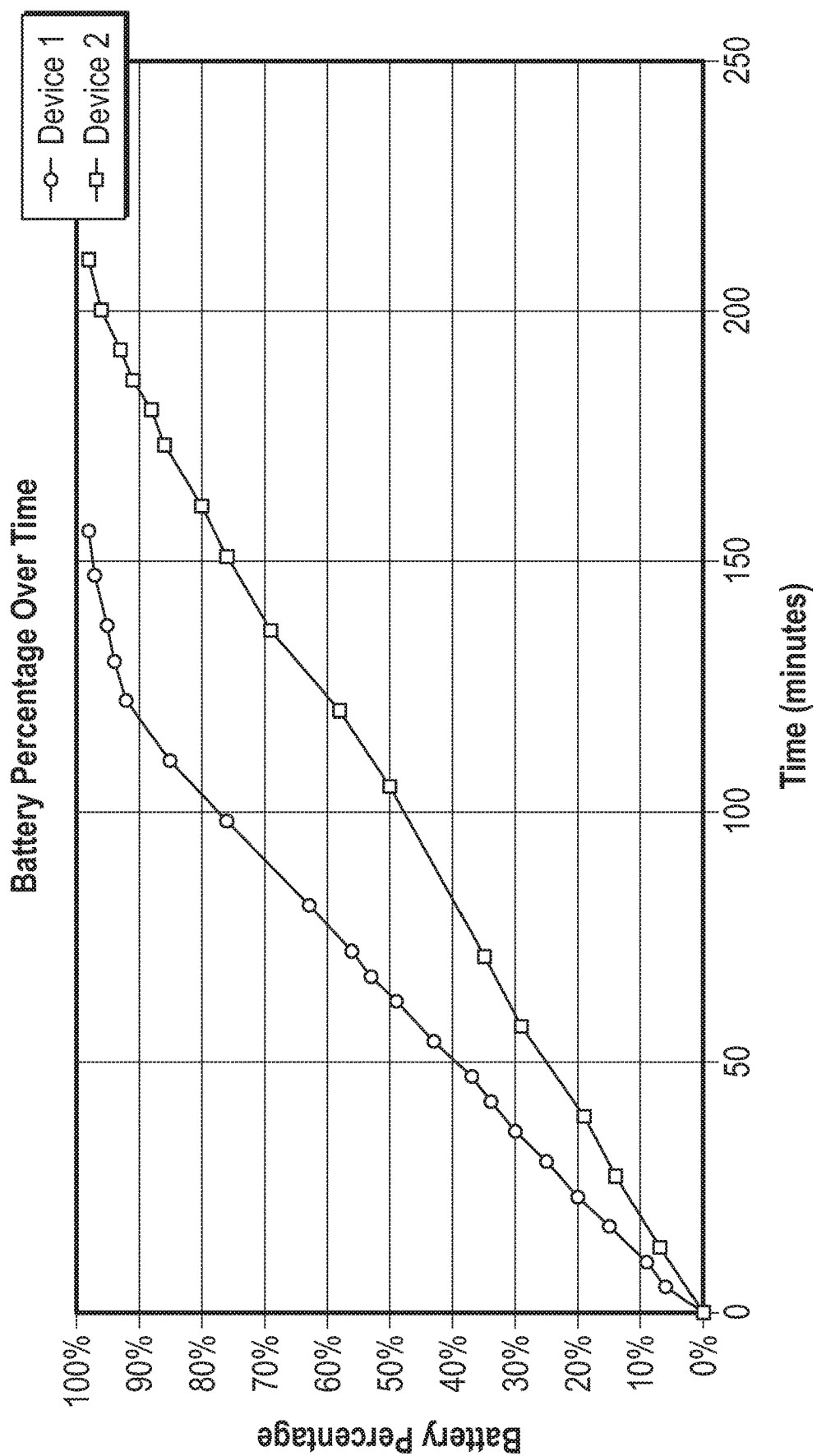
FIG. 10 depicts an example graph of battery percentage over time for two electronic devices, in accordance with the present disclosure.

FIG. 9 is a flow chart illustrative of a method of charging electronic devices 900 in accordance with the present disclosure. The method may begin with the USB power delivery system 100 publishing available voltages (e.g., 5V, 9V, and 15V) to two devices connected to the connectors 190*a*, 190*b* (block 910). Next, the USB power delivery system 100 determines the battery charge level of the two devices based on the current draw (block 920). Optionally, the USB power delivery system 100 may also determine the charge level based on the amount of time the device has been charging (block 930). For example, a timer starts when a device is plugged into a first connector 190*a*. Then another timer starts when a device is plugged into the second charging port 190*b*. The USB power delivery system 100 can then determine which device has the higher battery charge level based on charging profiles of the devices (e.g., the charging profiles illustrated in FIG. 10 and/or FIG. 11) and the timers.

Next, depending on which device has a higher battery charge level (block 940), the USB power delivery system 100 prioritizes which device receives more power. If the second device is determined at block 940 to have a higher battery charge level, then the USB power delivery system 100 directs more power to the first device than to the second device by changing the voltage values that are published to each device (block 950). If the first device is determined at block 940 to have a higher battery charge level, then the USB power delivery system 100 directs more power to the second device than to the first device by changing the voltage values that are published to each device (block 960).

Figure 12:
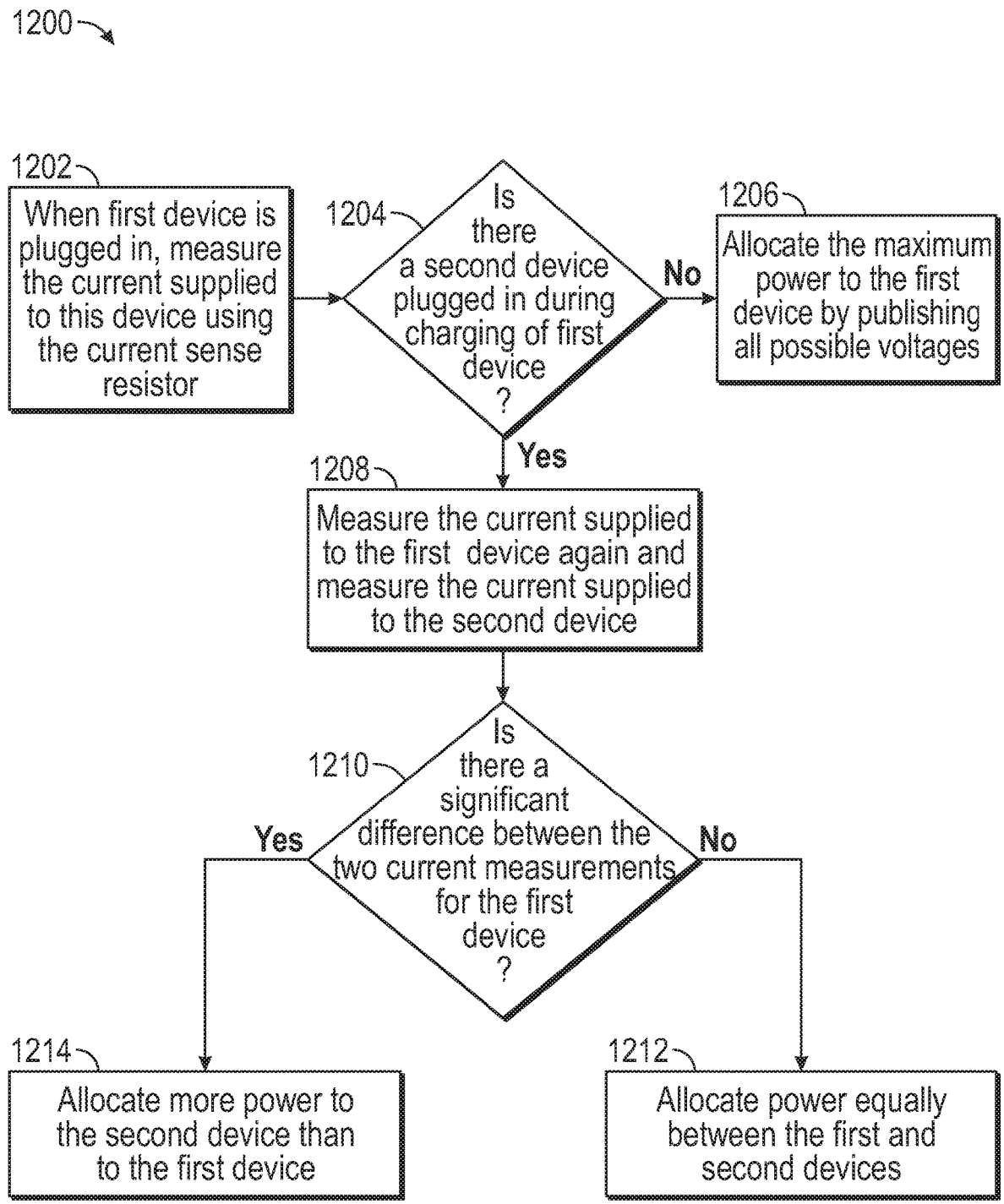
FIG. 12 is a flow chart illustrative of the method of charging electronic devices in accordance with the present disclosure.

FIG. 12 is a flow chart illustrating an exemplary embodiment of a method of charging devices in accordance with the present disclosure. The method may begin with a first device being plugged into the first USB Type-C power distribution connector 190*a* of the USB power delivery system 100. In an embodiment, the current supplied to the first device is measured using a current sense resistor (block 1202). Next, the master controller IC 406 determines whether a second device is plugged in during the charging of the first device (block 1204). If no second device is plugged in during the charging of the first device, then the USB power delivery system 100 allocates or continues to allocate the maximum amount of power to the first device by publishing all available voltage levels to the first device (block 1206).

If a second device is plugged in during the charging of the first device, then the USB power delivery system 100 measures the current supplied to the first device again and measures the current supplied to the second device (block 1208).

Next, the USB power delivery system 100 determines whether there is a significant difference between the two current measurements for the first device (block 1210). The significant difference may be a threshold difference indicating that the charging of the first device has transitioned from stage A to stage B of the charging cycle. If there is no significant difference between the current measurements for the first device (indicating that the charging of the first device has not transitioned from stage A to stage B of the charging cycle), the USB power delivery system 100 supplies at least equal power allocation to the first electronic device and the second electronic device (block 1212). Charging power is allocated equally to the first and second devices by publishing the same sets of available voltage values to the first and second devices. The published sets of available voltage values may include a maximum voltage value that, if supplied to both the first and second devices, would be within the charging capacity of the USB power delivery system 100.

Figure 11:
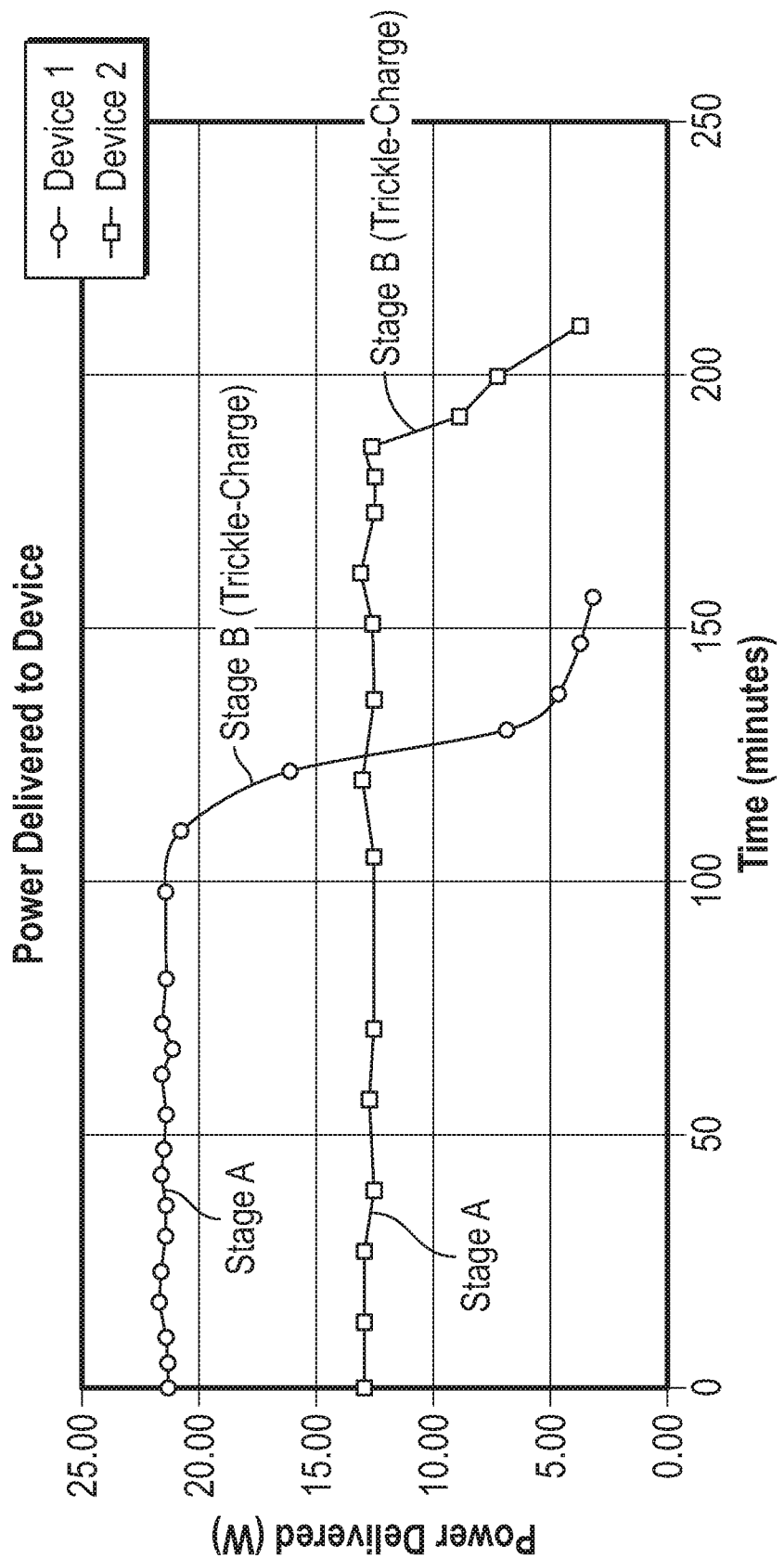
FIG. 11 depicts an example graph of power delivered to two electronic devices over time, in accordance with the present disclosure.

If there is a significant difference between the current measurements for the first device, the USB power delivery system 100 determines that the first device has entered stage B (trickle charging) as depicted in FIG. 11 and allocates more power to the second device than to the first device (block 1214). This may be accomplished by publishing higher voltage voltages to the second device than to the first device.

In embodiments where the USB power delivery system 100 is configured to supply a constant current to the first and second electronic devices, different charging powers may be allocated between first and second electronic devices by publishing different sets of voltage values to the first and second electronic devices corresponding to those different charging powers.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

The invention claimed is:

1. A universal serial bus (USB) charging system configured to charge a plurality of electronic devices, the USB charging system comprising:
  a power supply including a plurality of power converters and a plurality of power supply outputs electrically coupled to the plurality of power converters, respectively, each of the plurality of power converters configured to convert an input voltage to a plurality of different output voltages;
  a plurality of charging ports electrically coupled to the plurality of power supply outputs, respectively, each of the plurality of charging ports configured to connect to, and provide an output voltage selected from the plurality of different output voltages to, an electronic device;
  a controller in electrical communication with the power supply and the plurality of charging ports, the controller comprising:
    one or more processors;
    a single master controller in electrical communication with the plurality of charging ports; and
    a memory having stored thereon instructions which, when executed by the one or more processors, cause the controller to:
      communicate information regarding the plurality of different output voltages from the single master controller to first and second electronic devices via respective first and second charging ports of the plurality of charging ports;
      receive, via the respective first and second charging ports, information regarding first and second output voltages selected from the plurality of different output voltages by the respective first and second electronic devices; and
      control the power supply to provide the selected first output voltage to the first electronic device and to provide the selected second output voltage to the second electronic device; and
  a first power delivery (PD) controller integrated circuit (IC) and a second PD controller IC, the first and second PD controller ICs electrically coupled to the single master controller and configured to selectively disable transmission of electrical energy to corresponding charging ports,
  wherein the first PD controller IC is not directly connected with the second PD controller IC.

2. The USB charging system of claim 1, wherein the controller communicates a first set of output voltages to the first electronic device and communicates a second set of output voltages to the second electronic device, wherein the first set is different from the second set.

3. The USB charging system of claim 2, wherein the instructions, when executed by the one or more processors, further cause the controller to:
  determine the first and second sets of output voltages based on at least one parameter associated with the first and second electronic devices, respectively.

4. The USB charging system of claim 2, wherein the plurality of charging ports are USB Type-C charging ports.

5. The USB charging system of claim 3, wherein the at least one parameter is at least one of the current being drawn by each of the first and second electronic devices, the charge levels of each of the first and second electronic devices, the period over which each of the first and second electronic devices have been charged by the USB charging system, and the priority level of each of the first and second electronic devices.

6. The USB charging system of claim 5, wherein the priority level is determined based on the order in which the first and second electronic devices are connected to the USB charging system.

7. The USB charging system of claim 5, further comprising a current sense resister coupled to each of the first and second charging ports,
  wherein the instructions, when executed by the one or more processors, cause the controller to measure voltage across each of the current sense resistors and determine a charge level of each of the first and second electronic devices based on the measured voltages.

8. The USB charging system of claim 5, wherein the controller determines a first set of output voltages that includes an output voltage greater than the output voltages in the second set of output voltages, if the first electronic device has the lower charge level than the second electronic device.

9. The USB charging system of claim 1, wherein the first and second sets of output voltages are determined based on total power that can be provided by the USB charging system.

10. The USB charging system of claim 1, wherein the single master controller is configured to independently control the first and second PD controller ICs.

* * * * *